United States Patent [19]

Hiraishi et al.

[11] Patent Number: 5,375,759
[45] Date of Patent: Dec. 27, 1994

[54] ALLOY COATED METAL BASE SUBSTRATES, SUCH AS COATED FERROUS METAL PLATES

[75] Inventors: Masahiro Hiraishi, Kawasaki; Yoshihito Watanabe, Sendai, both of Japan

[73] Assignee: Eutectic Corporation, New York, N.Y.

[21] Appl. No.: 171,022

[22] Filed: Dec. 21, 1993

[30] Foreign Application Priority Data

Feb. 12, 1993 [JP] Japan .................. 5-023097

[51] Int. Cl.⁵ .................. B23K 1/00; B23K 31/00
[52] U.S. Cl. .................. 228/175; 228/122.1; 228/215; 427/190; 427/191; 29/423
[58] Field of Search .............. 228/122.1, 124.1, 175, 228/215, 216; 427/190, 191; 29/423; 164/97

[56] References Cited

U.S. PATENT DOCUMENTS

| | | | |
|---|---|---|---|
| 3,876,447 | 4/1975 | Lally | 228/122.1 |
| 4,333,419 | 6/1982 | Hufnagl et al. | 427/191 |
| 4,441,903 | 4/1984 | Bhatti | 228/235.1 |
| 4,471,034 | 9/1984 | Romero et al. | 428/679 |
| 4,806,394 | 2/1989 | Steine | 427/423 |
| 4,938,991 | 7/1990 | Bird | 427/191 |

*Primary Examiner*—Samuel M. Heinrich
*Attorney, Agent, or Firm*—Hopgood, Calimafde, Kalil & Judlowe

[57] ABSTRACT

A method is provided for applying a self-fluxing, self-bonding alloy coating of a hard facing alloy in powder form to a ferrous metal plate or substrate of melting point substantially higher than that of the hard facing alloy. The method comprises providing a plate of a ferrous metal substrate to be coated in which a surface of the plate to be coated is cleaned, e.g., by grit blasting. A retaining bank is formed substantially about a predetermined periphery of the plate by forming a ridge of a predetermined height on the clean surface to provide a confining zone into which a powder of the hard facing alloy is smoothly applied to a predetermined thickness to provide a composite of the alloy powder and the substrate. The powder may have an average particle size ranging from about 40 mesh to about 400 mesh (U.S. Standard) e.g., about 80 mesh to about 325 mesh. Following the application of the alloy powder to the confining zone to provide a composite, the composite is heated under substantially non-oxidizing conditions at a temperature sufficiently high to melt the alloy powder but below the melting temperature of the metal substrate, and thereby provide a dense alloy coating bonded to the ferrous metal plate or substrate. The coated plate is then cooled under substantially non-oxidizing conditions to solidify the coating.

14 Claims, 2 Drawing Sheets

ALLOY COATED METAL BASE SUBSTRATES, SUCH AS COATED FERROUS METAL PLATES

This invention relates to alloy-coated metal substrates, such as coated ferrous metal plates, wherein the coating material is a self-fluxing, self-bonding alloy.

BACKGROUND OF THE INVENTION

Hard surfaced steel plates by arc welding have been employed for wear parts protection. Such plates have been manufactured by open-arc welding or by using submerged welding procedures. On the other hand, metal-sprayed procedures have been used, including fusing sprayed alloy powders, these procedures being employed for the same purpose.

In this connection, reference is made to U.S. Pat. No. 4,471,034 which relates to the production of alloy coatings on cast iron parts by thermal spraying using plasma transfer arc welding. The alloys disclosed are nickel-base self-fluxing, self-bonding alloys.

Another patent is U.S. Pat. No. 4,806,394 which relates to a method for producing a wear-resistant layer on a metal base using autogenous flame spraying to produce a bonded layer of at least 1 mm.

A disadvantage of the foregoing methods is the limitation on the thickness of the coating or the tendency for substantial dilution of the coating metal with the base metal. Because of the tendency of dilution of the coating, it is difficult to retain the primary composition of the alloy coating and, because of the reactions in the flame, the hardness expected of the self-fluxing, self-bonding alloy.

In addition, it is sometimes necessary to apply the coating in multiple passes on the base metal in order to assure the required hardness. This is usually attended by certain inconveniences such as the following: (1) additional welding labor costs; (2) increased production hours, (3) the decrease in hardness approaching the metal substrate because of dilution; (4) the difficulty of controlling thickness together with the dilution of the coating because of overheating; and (5) the fact that the final coated plate does not always meet specifications.

Moreover, in carrying out the self-bonding powder fusing procedure of the prior art, it is very difficult to produce a thick layer of the coating with the desired hardness and because of surface cracking and lifting of the coating. Thick coatings are especially desirable for wear parts produced from metal plates, particularly where long life of the coated substrate is essential.

Another disadvantage of producing coated metal substrates by thermal spraying is considerable loss of powder during spraying which adds to the cost of producing the final product.

The invention will now be described in light of the following disclosure, the drawings and the appended claims.

IN THE DRAWINGS

Figure 6:
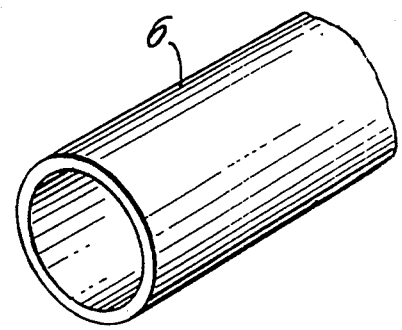
Figure 4:
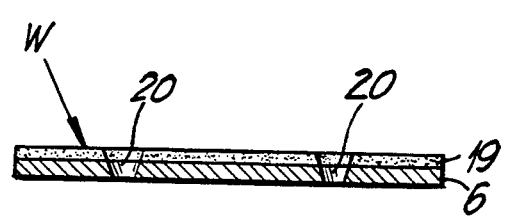
Figure 7:
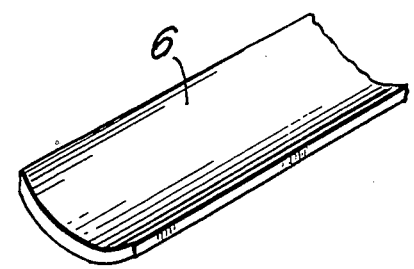
Figure 5:
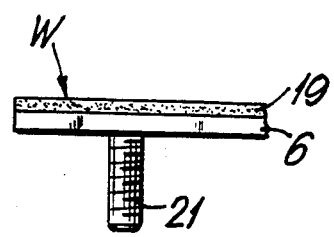
Figure 8:
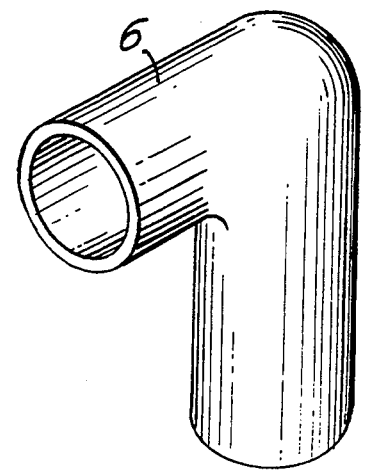

FIGS. 4 and 5 depict the use of the coated steel plate as an attachment to the walls or inner casings of hoppers, and the like; and FIGS. 6–8 are illustrative of other applications of substrates having curved surfaces in which a plastic mixture of the alloy powder and water glass may be used which mixture is then plastered to the curved surfaces with means (not shown) for confining said mixture during the heat treatment thereof in the furnace.

SUMMARY OF THE INVENTION

Stating it broadly, one embodiment of the invention resides in a method for producing coated metal plates, such as steel plates, in which the coating material is an alloy powder referred to herein as a self-fluxing, self-bonding alloy composition. Such alloys generally have a melting or fusion range of about 1,850° F. to 2,050° F.

The method comprises, providing a metal substrate of melting point substantially higher than that of the coating alloy to be applied, such as a ferrous-metal, e.g., a steel plate, having a melting temperature generally about 2,500° F.

The surface to be coated is cleaned, such as by grit blasting or other convenient means.

A retaining bank is formed substantially about a selected periphery of said plate by forming a ridge of selected height to provide a confining zone into which a powder of the hard-facing alloy is smoothly applied to a predetermined thickness to provide a composite of said powder and said substrate.

Figure 2:
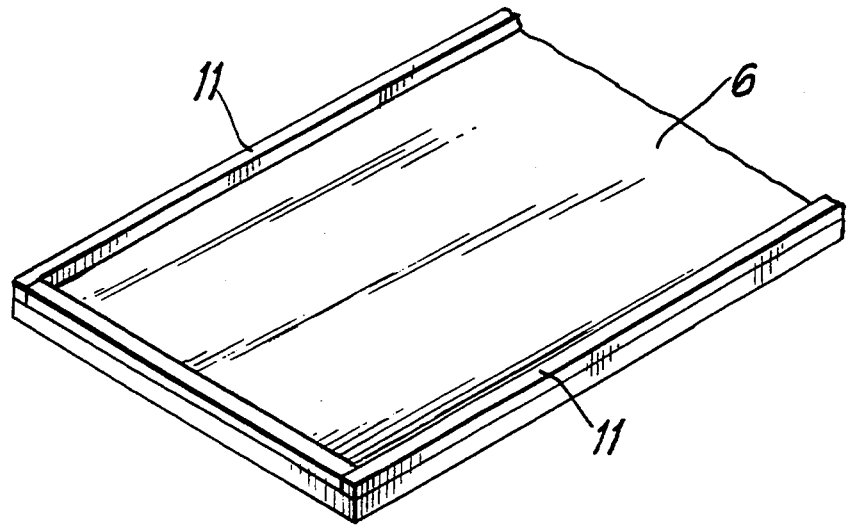
FIG. 2 depicts one method of preparing a steel plate for receiving a layer of alloy powder prior to the fusing thereof in a furnace of the type illustrated in FIG. 1.
Figure 3:
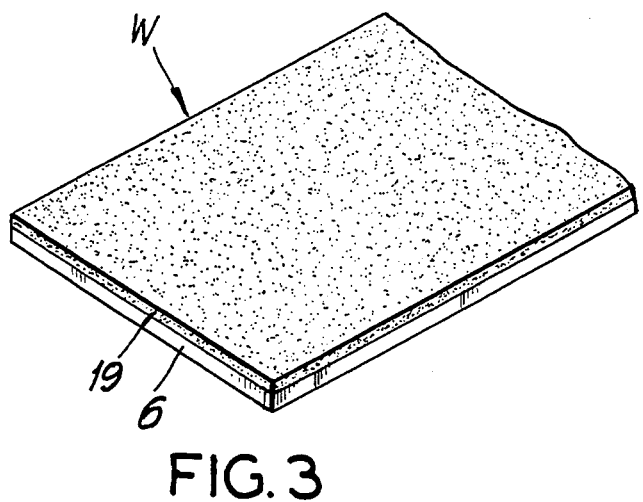
FIG. 3 is illustrative of a coated steel plate produced in accordance with the invention.

The retaining bank or ridge may be produced by spot-welding sections of wire rod (e.g., of steel) about a selected periphery of the plate to be coated such as shown in FIG. 2. The powdered alloy employed as the matrix metal has an average particle size ranging from about 80 mesh to about 325 mesh (U.S. Standard).

The composite is then subjected to heating under substantially non-oxidizing conditions at a temperature sufficiently high to melt said alloy powder but not the substrate and provide a dense alloy coating bonded to the ferrous metal substrate. The heated composite is then cooled under substantially non-oxidizing conditions to solidify the coating whereby a dense well bonded coating is produced.

The purpose of the procedure described broadly above is basically to build up a coating of the self-bonding alloy powder on the surface of carbon steel and/or stainless steel, or other ferrous alloy substrate. Ferrous metals are those having a melting point above 2,500° F.

DETAILS OF THE INVENTION

The invention will now be described with respect to FIG. 1 as follows:

A carbon steel plate measuring 4 inches wide by 40 inches long and ¼ inch thick is prepared by first producing a confining zone on the surface thereof as in FIG. 2.

A particular hard-facing self-fluxing, self-bonding alloy is one having a matrix which contains about 0.55 to 0.75% C, about 2.75 to 3.5% B, about 3.5 to 4.5% Si, about 2.75 to 4.0% Fe, about 13 to 15% Cr and which includes, about 35% WC sintered with 5–15% Co, and the balance essentially nickel.

Another hard-facing alloy is a self-fluxing, self-bonding alloy containing about 0.7 to 0.8% °C., about 3–3.7% B, about 3.8 to 4.5% Si, about 16.5 to 19.5% Cr, about 4.0 to 5.5% Mo, about 1.5 to 2.25% Cu and the balance essentially nickel. Said alloy may serve as a matrix metal to which fairly coarse wear resistant particles can be added, such as WC or cobalt-bonded WC and other hard metal compounds, as disclosed herein.

Figure 1:
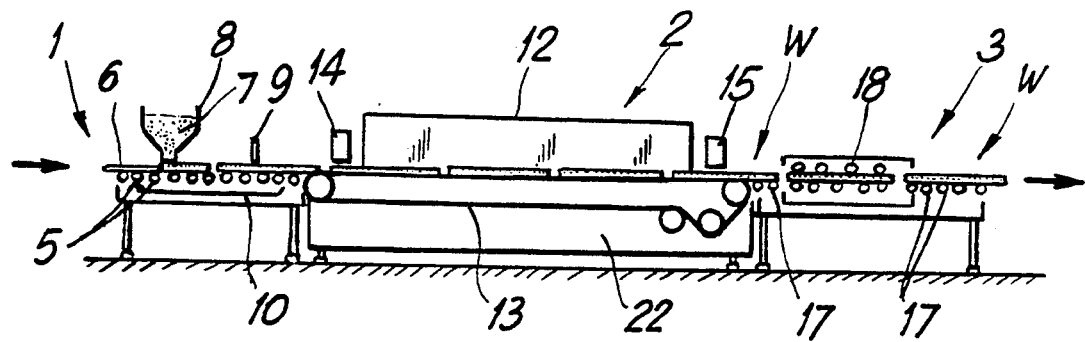
FIG. 1 is a schematic of one embodiment of the furnace equipment which may be employed in carrying out a preferred method of coating metal plates, including plates of carbon steel, stainless steel, and other ferrous metal substrates.

In carrying out the invention, the process of manufacturing employs the procedure described with respect to FIG. 1 comprising a work inlet section 1, a fusing section 2 and a work outlet or discharge section 3.

The work inlet section comprises inlet 1 consisting of roller conveyors 5, a hopper 8 containing the alloy powder to be fed to the metal plate, or ferrous metal substrate, and a saucer or pan 10 disposed below the conveyor for catching excess powder.

The charged plates 6 containing the layer of powder are transported into the furnace by the roller conveyor. The plates pass under hopper 8 from which powder 7 is fed to each of the plates. Any excess powder is smoothly removed by scraper blades 9 which overflows into saucer 10 beneath the conveyor. The thickness of the powder layer may range from about 0.1 to 0.40 inch, or 0.16 to 0.36, the recommended thickness being about 0.12 to 0.24 inch.

The charged plates are transported into fusing section 2 comprising muffle furnace 12. Belt conveyors 13 made of metal strip or sheet transport the charged plates into the fusing section where they are heated in the electrical heating furnace 12. A typical processing speed or velocity is one ranging from about 33 inch/min. to 60 inch/min. Each plate with the powder layer is preferably heated for about 5 minutes. The electrically heated furnace is about 16 feet long.

The fusing temperature is maintained in the neighborhood of about 2,000° F. to 2,200° F., preferably about 2,012° F. to 2,156° F.

A non oxidizing condition is maintained in the furnace by means of a carbonic gas atmosphere produced by combusting propane gas to produce a non-oxidizing gas comprised of CO and $CO_2$. The non-oxidizing atmosphere is provided by maintaining a predetermined ratio of CO to $CO_2$ which is well known to those skilled in the art. As an alternative, a reducing atmosphere may be employed comprised of 90% $N_2$ and 10% $H_2$, a composition well known in the art which is safe and non-explosive.

As the coated metal plates leave furnace 12, they are passed through a leveler roller system 18 comprising an array of alternately arranged upper and lower rollers 17 between which the plates are passed to remove any warpage in the plates by a predetermined pressure co-operatively applied by the upper and lower rollers.

Aluminum shutters 14 and 15 are provided at each end of the furnace to minimize or inhibit gas leakage.

Preheating and post heating heaters are disposed in the line of travel of the plates in order to moderate heat input into the plates.

The plates are passed into the final section, that is, through the leveler roller 18 where they are allowed to cool down while being straightened.

The plates with the wear resistant coating W can be easily cut using a plasma torch or other type of high speed cutter.

Because of the quality of the coating produced, the plates can be bent to a desired shape with the coating intact on the inside surface of the bent plate.

It has been noted that in producing a fused layer of about 0.1 inch thick, a smooth powder layer of about 0.13 inch thick may be employed.

The invention thus provides as a composite article of manufacture an alloy-coated metal plate produced in accordance with the method.

The various shapes of the wear-resistant coated plates that can be easily applied to machine parts that need wear protection are shown in FIGS. 4 and 5.

The method of the invention is also applicable to the coating of curved metal substrates such as those illustrated in FIGS. 6–7.

Another method which may be employed is to mix the alloy powder with water glass sufficient to form a pliable paste that can be applied to the curved surface. The part thus coated can be treated in a furnace similar to that in FIG. 1 to form an adherent coating on the curved surface. The slag formed on the surface of the fused coating can be easily removed by wire brushing.

Water glass (i.e., sodium silicate) having a density of about 1.2 to 1.4, e.g., 1.38 grams/cc, may be used in forming the paste.

Generally speaking, the self-fluxing alloy may comprise a nickel-base alloy containing by weight less than about 1% carbon, about 0.5 to 4% boron, about 1 to 5% silicon, up to about 5 or to 10% iron, about 5% to 30% chromium, e.g., about 10% to 20% chromium, and the balance essentially nickel. As a further composition, the above-identified alloy may also contain about 20% to 50% by weight of at least one wear resistance material selected from the group consisting of refractory metal oxides (e.g. MgO, $Al_2O_3$, etc.) and carbides or borides selected from the group consisting of W, Mo, Cr, Ti, Zr, Hf, Nb, V and Ta.

As stated herein, the method of the invention has the advantage in that it can provide substantial savings in labor costs.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of applying a self-fluxing, self-bonding alloy coating of a hard-facing alloy in powder form to a ferrous metal substrate of melting point substantially higher than that of the hard-facing alloy which comprises:

providing a plate of ferrous metal substrate to be coated, cleaning a surface of said plate to be coated;

forming a retaining bank substantially about a selected periphery of the clean surface of said plate by forming a ridge of predetermined height to provide a confining zone into which hard-facing alloy in particulate form is smoothly applied to a predetermined thickness determined by the height of said ridge to provide a composite of said powder and said substrate, subjecting said composite to heating under substantially non-oxidizing conditions at a temperature sufficiently high to melt said alloy powder but below the melting temperature of said ferrous metal substrate and thereby provide a dense alloy coating bonded to said ferrous metal substrate, and cooling said heated composite under substantially non-oxidizing conditions to solidify the coating.

2. The method of claim 1, wherein the size of the hard facing powder ranges from about 40 mesh to about 400 mesh (U.S. Standard).

3. The method of claim 2, wherein the particle size ranges from about 80 mesh to about 325 mesh.

4. The method of claim 1, wherein said alloy is an iron-group metal base alloy containing by weight at least one of the self-fluxing elements selected from the group consisting of about 1–5% silicon and about 0.5–4% boron.

5. The method of claim 4, wherein the hard-facing alloy is a nickel-base alloy containing by weight about 1–5% silicon and about 0.5 to 4% boron.

6. The method of claim 1, wherein the ridge surrounding the selected periphery of said ferrous metal plate is formed by spot-welding wire rods of predetermined thickness along and around the selected periphery.

7. The method of claim 1, wherein the powdered hard-facing alloy is applied as a paste comprised of a mixture of water glass and said hard-facing alloy powder.

8. The method of claim 4, wherein the powdered alloy-containing material also includes at least one wear resistant material in amount ranging up to about 60% by weight selected from the group consisting of refractory metal oxides and carbides or borides of tungsten, molybdenum, chromium, titanium, zirconium, hafnium, niobium, vanadium and tantalum.

9. The method of claim 5, wherein the nickel-base alloy is comprised by weight of less than about 1% carbon, about 0.5 to 4% boron; about 1–5% silicon, up to 5% iron, about 10% to 20% chromium, up to about 6% molybdenum, about 20% to 50% WC, and the balance essentially nickel.

10. The method of claim 9, wherein the nickel-base alloy is selected from one of the group consisting of by weight:
(1) about 0.5 to 0.8 of carbon, about 3 to 3.7% boron, about 3.8 to 4.5% silicon, about 16.5 to 19.5 chromium, about 4 to 5.5% molybdenum, about 1.5 to 2.25% copper and the balance essentially nickel; and
(2) about 0.5 to 0.75% carbon, about 2.75 to 3.5% boron, about 3.5 to 4.5% silicon, about 2.75 to 4% iron, about 13 to 15% chromium and the balance essentially nickel.

11. A method of applying a self-fluxing, self-bonding hard facing coating material comprising a hard facing alloy powder in powder form to a ferrous metal substrate,
said alloy powder in said coating material being a nickel-base alloy comprising by weight less than 1% carbon, about 0.5 to 4% boron, about 1 to 5% silicon, up to about 5% iron, about 5% to 30% chromium and the balance essentially nickel;
cleaning a surface of said substrate to be coated;
forming a retaining bank about a selected periphery of the clean surface of said plate by forming a ridge of predetermined height to provide a confining zone for said powder,
providing said hard coating material in powder form having an average particle size ranging from about 40 mesh to about 400 mesh (U.S. Standard),
applying said alloy powder smoothly as a layer of predetermined height in said confining zone of said substrate to provide a composite thereof, and
heating said composite in a furnace under substantially non-oxidizing conditions at a temperature sufficient to melt said alloy-powder but below the melting temperature of said ferrous metal substrate and thereby bond the alloy to said substrate; and
cooling said heated composite material to solidify the coating.

12. The method of claim 11, wherein the average particle size ranges from about 80 mesh to about 325 mesh.

13. The method of claim 9, wherein the powdered alloy-containing material also includes at least one wear resistant material in an amount ranging from about 20% to 50% by weight selected from the group consisting of refractory metal oxides and carbides or borides of tungsten, molybdenum, chromium, titanium, zirconium, hafnium, niobium, vanadium and tantalum.

14. A method of applying a self-fluxing, self-bonding alloy coating of a hard-facing alloy in powder form to a metal substrate of melting point substantially higher than that of the hard-facing alloy which comprises:
providing a plate of a metal substrate to be coated,
cleaning a surface of said metal plate to be coated;
providing a confining zone on said surface onto which a powder of the hard-facing alloy is smoothly applied to a predetermined thickness within said zone, and thereby provide a composite of said powder and said metal substrate,
said powder having an average particle size ranging from about 80 mesh to about 325 mesh (U.S. Standard),
subjecting said composite to heating under substantially non-oxidizing conditions at a temperature sufficiently high to melt said alloy powder but below the melting temperature of said metal substrate and thereby provide a dense alloy coating bonded to said metal substrate,
and cooling said heated composite under substantially non-oxidizing conditions to solidify the coating.

* * * * *